United States Patent [19]

Rudiger et al.

[11] Patent Number: 4,765,689
[45] Date of Patent: Aug. 23, 1988

[54] PRESSURE MODULATOR DEVICE

[75] Inventors: Eckhart Rudiger; Ulrich Stein, both of Ebern, Fed. Rep. of Germany

[73] Assignee: FAG Kugelfischer Georg Schafer (KGaA), Fed. Rep. of Germany

[21] Appl. No.: 22,738

[22] Filed: Mar. 6, 1987

[30] Foreign Application Priority Data

Mar. 14, 1986 [DE] Fed. Rep. of Germany ....... 3608573

[51] Int. Cl.⁴ .............................................. B60T 8/42
[52] U.S. Cl. ................................... 303/115; 303/9.75
[58] Field of Search ................... 188/181 A; 303/6 R, 303/22 R, 56, 113, 115

[56] References Cited

U.S. PATENT DOCUMENTS 4,268,092  5/1981  Young .............................. 303/22 R
4,358,163  11/1982  Young .............................. 303/22 R
4,436,348  3/1984  Farr ..................................... 303/115

Primary Examiner—Duane A. Reger
Attorney, Agent, or Firm—Ostrolenk, Faber, Gerb & Soffen

[57] ABSTRACT

A pressure modulator device in which a lever mechanism with variable transmission ratio is employed to minimize the lateral forces acting on the pressure relief piston and its guides during the stroke of the piston, in both the unloading and the reloading phases of pressure relief.

9 Claims, 4 Drawing Sheets

PRESSURE MODULATOR DEVICE

BACKGROUND OF THE INVENTION

1. Field of the Invention

The present invention relates to a pressure modulator device for anti-locking brake systems in automotive vehicles.

2. Description of Related Art

In automotive vehicles provided with an antilocking braking system, when braking of a braked wheel exceeds a given deceleration threshold, for instance 12 m/s$^2$, the anti-locking device generates an electric signal to reduce the braking pressure until a lower second deceleration threshold, for instance 10 m/s$^2$, is passed. Thereafter, the anti-locking device generates an electric signal to increase the braking pressure and deceleration increases again up to the first deceleration threshold.

This increasing and decreasing of the braking pressure may be effected by means of a pressure modulator device as disclosed in commonly assigned U.S. patent application Ser. No. 899,212 filed Aug. 21, 1986 now U.S. Pat. No. 4,691,813 issued August 1987, the disclosures of which are incorporated herein by reference.

Related developments are disclosed in commonly assigned U.S. Pat. No. 4,511,971; U.S. patent applications Ser. No. 899,201, allowed and Ser. No. 899,208 now U.S. Pat. No. 4,717,211 issued Jan. 5, 1988, both filed Aug. 21, 1986; and U.S. patent application Ser. No. 22,797 filed Mar. 6, 1987, of even date herewith. These disclosures are also incorporated herein by reference.

SUMMARY OF THE INVENTION

The primary object of the present invention is to improve the pressure modulator device disclosed in Ser. No. 899,212, so as to reduce the lateral forces which act on the pressure relief piston and the guides thereof, in both the relief phase and the reloading phase of pressure modulation.

This object is achieved by a pressure modulator comprising an inlet for receiving hydraulic pressure from a master cylinder; an outlet for transmitting hydraulic pressure to a brake; and control means for communicating pressure between the inlet and the outlet, the control means including an expandable chamber having a valve for controlling fluid flow between the chamber and the inlet, the chamber being partially defined by a movable section thereof, and the outlet communicating with the chamber independently of the valve. First biasing means urge the valve in a closing direction, while second biasing means urge the movable section in a first direction to reduce the volume of the chamber. The movable section engages the valve, the second biasing means thereby biasing the valve in an opening direction opposite to the closing direction. Actuating means are provided for selectively exerting an actuating force for opposing the second biasing means, and thereby moving the movable section in a second direction to increase the volume of the chamber. Transmission means are provided for transmitting forces between the actuating means, the movable section and the second biasing means. The transmission means includes lever means providing a transmission ratio which varies as a function of the movement of the movable section. Advantageously, the lever means includes first and second tappets respectively engaging the movable section and the second biasing means, and a lever having first and second ends which are pivotally connected to the first and second tappets. The lever is preferably pivotally mounted in the pressure modulator at a point intermediate the first and second ends. The lever is configured and dimensioned for providing a step-down transmission ratio when the movable section is displaced relatively little in the second direction, but a step-up ratio when the movable section is displaced relatively farther in the second direction.

The improvement herein has the advantage that the lever mechanism is an easily constructed transmission mechanism and can be manufactured at favorable cost, while the step-up characteristic (transmission ratio) or the stroke ratio can be easily adapted to any given application because of the extremely large range of geometrical variations that are possible.

BRIEF DESCRIPTION OF THE DRAWINGS

Other objects, features and advantages of the invention will be seen in the following description of an embodiment thereof, with reference to the drawings, in which.

DETAILED DESCRIPTION OF THE ILLUSTRATED EMBODIMENT

Figure 1:
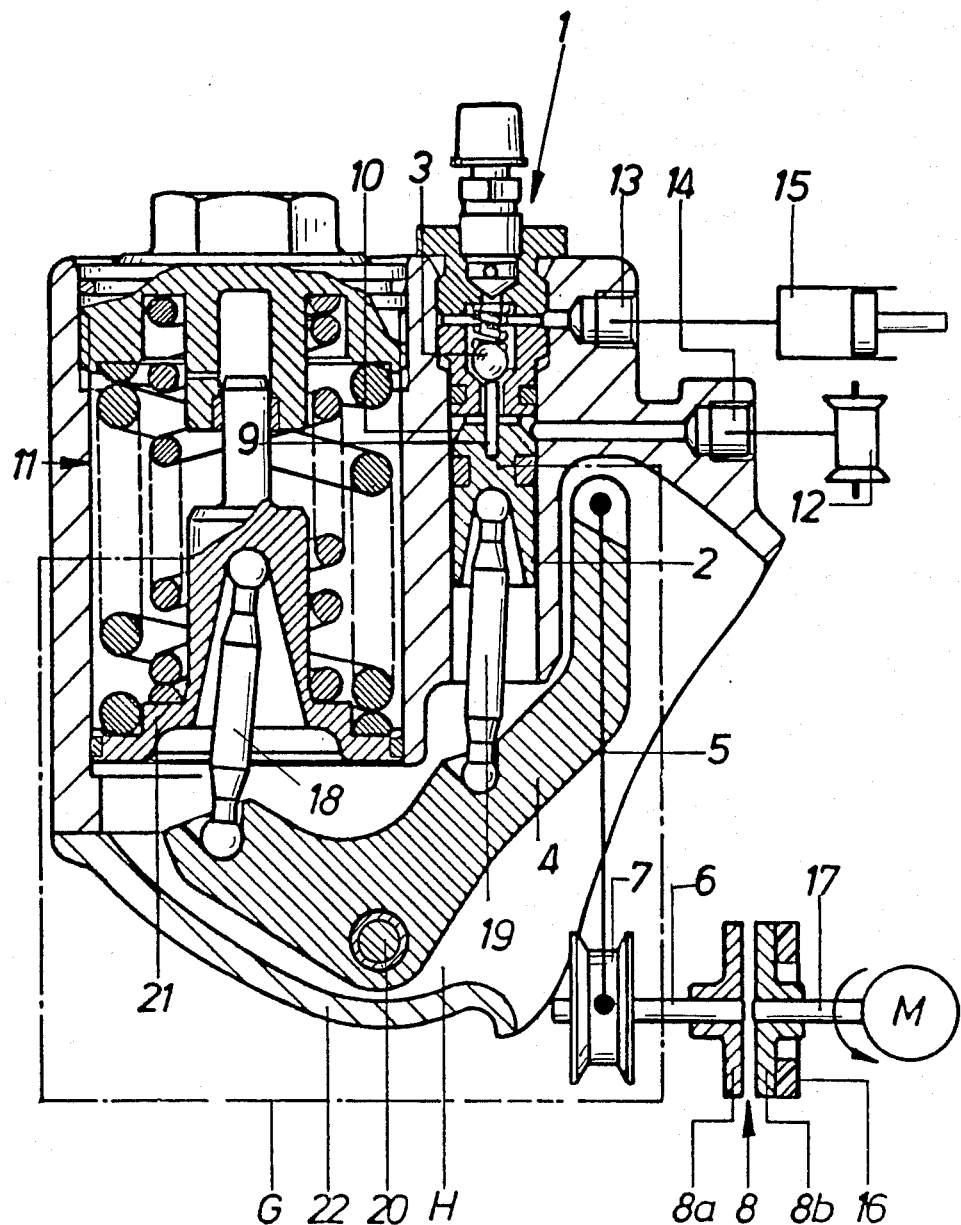
FIG. 1 is a cross-sectional elevation through a pressure modulator device.

FIG. 1 is an elevational cross-section of a pressure modulator 1, which includes a pressure relief piston 2 and a spherical-seat valve 3. A transmission G comprises a lever mechanism H which includes a lever 4, and two tappets 18, 19. A chain 5 is fastened to a first end of the lever 4 and to a pulley 7 seated on a shaft 6, which is driven by an electromagnetically controlled friction clutch 8. Adjacent to a second end of the lever 4 is a compression-spring assembly 11. The operational principles of the piston 2, valve 3 and clutch 8 are generally similar to the disclosures in Ser. No. 899,212.

FIG. 1 shows an initial position of the device. The compression spring assembly 11 holds the pressure relief piston 2 in its initial position via the lever mechanism H. The lever 4 is pivoted on a lug 20 on the housing 22. A first tappet 19 near the first end of the lever 4 engages the pressure relief piston 2. A second tappet 18 near the second end of the lever 4 engages the pressure plate 21 of the compression spring assembly 11. Each end of each tappet forms a ball joint with the component to which such end is connected.

In this initial position a tappet 9 which is fastened to the piston 2 engages the spherical-seat valve 3 and holds it open so that the master cylinder 15 and the wheel cylinder 12 are in communication with each other via the pressure space 10 of the valve 3. The master cylinder 15 is connected by a connection 13 upstream of the valve 3, and the wheel cylinder 12 is connected by a connection 14 downstream of the valve 3. The initial force of the compression spring assembly 11 is selected so that the pressure relief piston 2 is held in the initial position as long as the brake pressure, which is built up in the master cylinder 15 and passes via the pressure space 10 to the wheel cylinder 12, does not exceed a given value, for instance 150 bar.

A position measuring device (not shown) which determines the stroke of the pressure relief piston 2 is connected to a desired-value/actual-value comparator (not shown) which compares the measured stroke signal with a desired signal pre-established by the anti-locking device and controls the exciter coil 16 of the friction clutch 8 accordingly. The control arrangement is generally similar to the disclosures in Ser. No. 899,212.

The manner of operation of the pressure modulator will now be described with respect to two cases: uncontrolled braking, in which brake pressure is transmitted directly from the master cylinder to the wheel cylinder; and controlled braking, in which the master cylinder is disconnected and the wheel cylinder pressure is controlled by movement of the pressure relief piston 2.

Uncontrolled Braking

As long as the product of the brake pressure and the active piston surface area of the pressure relief piston 2 is less than the initial force exerted on the piston 2 by the spring assembly 11, taking into consideration the present transmission ratio (initially a step-up ratio) of the lever mechanism 4, the brake pressure supplied by the master cylinder 16 is transmitted directly to the wheel cylinder 12. At the moment that this product exceeds the initial force of the spring assembly 11, the pressure relief piston 2 is moved downward toward its lower end position. The tappet 9 comes out of engagement with the spherical-seat valve 3, which closes, and thus the master cylinder 15 is disconnected from the wheel cylinder 12.

If the initial spring force is selected so that it just corresponds to that brake pressure which, even under the best environmental conditions, leads to the locking of the wheel, locking is prevented. Thus, this arrangement results in relief of the structural parts, even in the case of panic braking, and thus a longer life of the brake components.

Controlled Braking

Excessive brake pressure on the wheel cylinder 12 may be reduced by enlarging the volume surrounding it. Given this basic concept, the manner of operation of the pressure modulator 1 in the case of controlled braking is as follows:

The anti-locking device recognizes the threat of overbraking of the wheel and provides a current to the exciter coil 16 of the friction clutch 8. The friction clutch 8 is actuated by this current, and a given torque resulting from the pressing force of the friction surfaces 8a, 8b against each other is transferred from the driven shaft 17 to the shaft 6. The chain 5 which is fastened to the first end of the lever 4 of the lever mechanism H is wound up on the pulley 7. This enlarges the pressure space 10 via the tappet 19, which functionally engages the lever 4 and the pressure relief piston 2. On the other hand, the compression spring assembly 11 is imparted a greater resilient force due to the oppositely directed upward movement of the tappet 18.

Thus, by the displacement of the pressure relief piston 2 in the direction toward its lower end position, the tappet 9 comes out of engagement with the spherical-seat valve 3 and the master cylinder 15 is disconnected from the pressure space 10 and from the wheel cylinder 12. Furthermore, with increasing enlargement of the pressure space 10, the effective brake pressure decreases. Referring again to Ser. No. 899,212, the actual value of the change in volume is compared via the position measuring device (not shown) with the desired value of pressure reduction, and the coil 16 is energized accordingly. When the wheel drops below the second deceleration threshold (10 m/s$^2$), the anti-locking device gives off signals to reduce the braking force further by precisely a predeterminable amount, which is calculated from the moment of inertia of the rotating wheel, so that the braked wheel is further accelerated; and then to increase the braking pressure again.

To increase the braking pressure, the desired relief piston stroke value input to the comparator (not shown) is reduced, whereupon the energizing of the coil 16 is reduced, which results in a smaller torque being transferred to the shaft 6. The pressure relief piston 2 is pushed upward by the force of the spring assembly 11 in the direction toward its initial position, corresponding to the step-up ratio prevailing at the time, as a result of which the active brake pressure in the wheel cylinder 12 increases.

Figure 4:
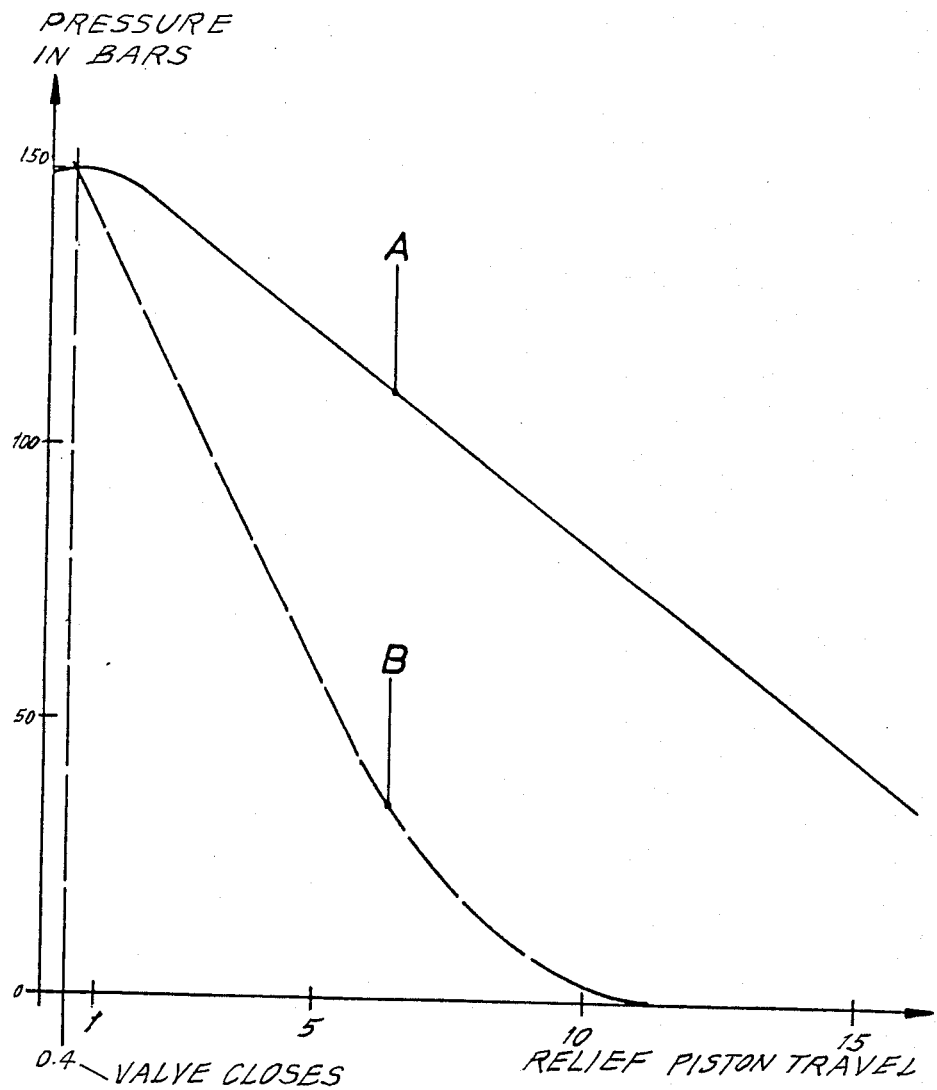
FIG. 4 is a diagram showing the reloading curve of the pressure relief piston (curve A) and the volume receiving capacity of the wheel cylinder (curve B).

It is important in this connection that the varying transmission ratio of the lever mechanism H be adapted, both to the change in spring force of the spring assembly 11 as a function of spring deflection; and to the change in the fluid volume receiving capacity of the wheel cylinder 12 (curve B in FIG. 4), which determines the minimum necessary change of force on the pressure relief piston 2 over its stroke; such that the reloading curve A of FIG. 4 is obtained for the pressure relief piston 2.

In this connection, the actual value of the change in volume is compared with the desired value of the increase in brake pressure, and the coil 16 is energized accordingly. When the upper deceleration threshold (12 m/s$^2$) is again reached, a new control cycle commences.

The continuous increasing and decreasing of the pressure takes place until either the vehicle has come to a standstill, or the pressure acting from the master cylinder 15 on the spherical-seat valve 3 is less than the pressure in the pressure space 10.

In order to be able to act on the piston 2 in the reloading phase with a force which corresponds to curve A of FIG. 4, the lever mechanism H is developed such that initially, the relief piston force that is referred to the spring assembly 11 is stepped up, while after a certain amount of piston travel the transmission ratio changes to a force step-down. This is obtained by the configuration of the lever 4, which is pivoted in the housing 22 on a lug 20; and by the spatial positions of the pivot points of the tappets 18, 19 on the lever 4 with respect to each other.

By this arrangement, lateral forces on the piston 2 and on the guide surfaces thereof in the housing 22 are minimized.

Figure 2:
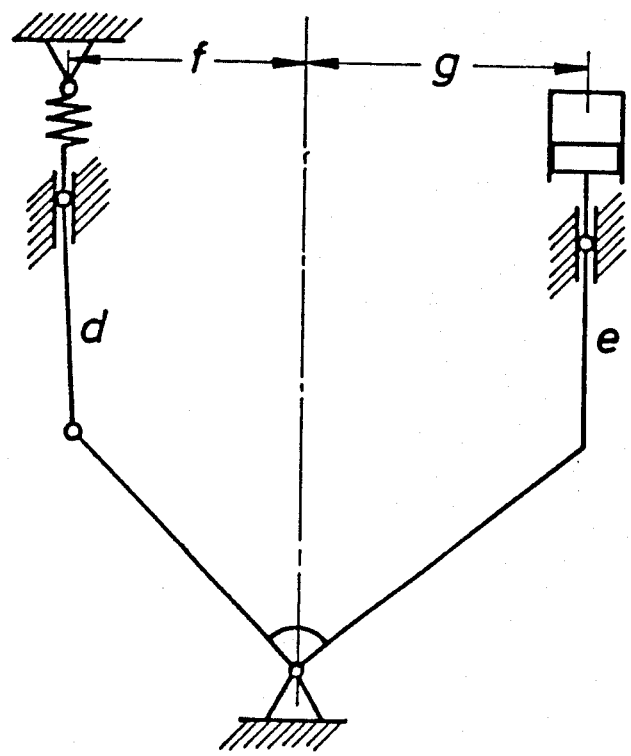
FIG. 2 is a schematic diagram of the lever mechanism.
Figure 3:
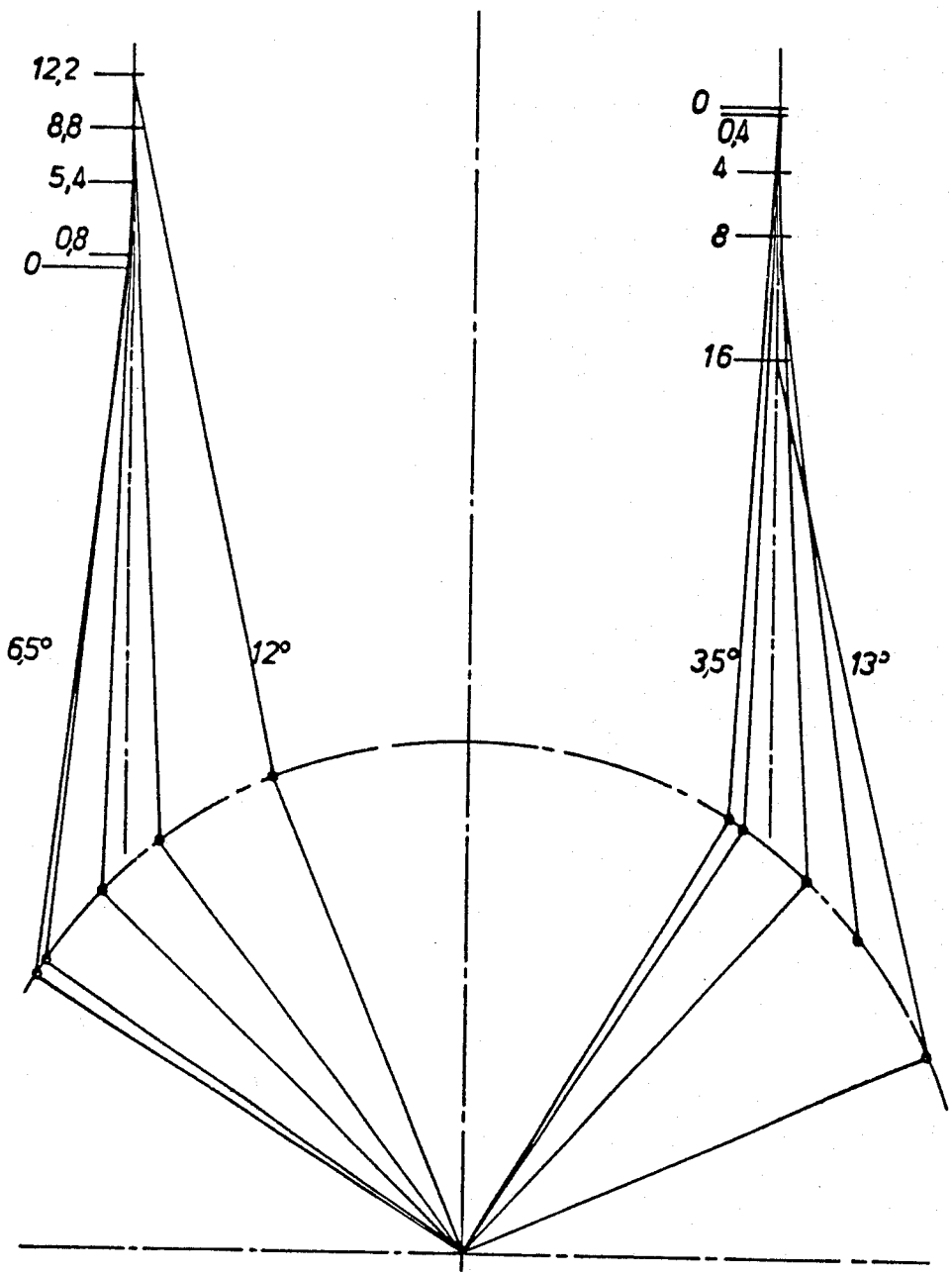
FIG. 3 is a diagram showing the kinematics of the lever mechanism between the starting and ending positions of the pressure relief piston.

The following description refers to FIGS. 2 to 4.

In FIG. 4, curve A shows the maximum reloading capacity of the spring assembly 11 and the dashed-line curve B shows qualitatively the fluid volume receiving capacity of the wheel cylinder 12.

The reloading capacity of the spring assembly 11 (curve A) is referred to the pressure relief piston 2 and is calculated both from the hydraulic pressure force on the pressure relief piston 2 and from the force of the compression spring assembly 11—in each case with due consideration of the step-up or step-down ratio prevailing at the time.

From the volume receiving capacity of the wheel cylinder 12, shown qualitatively (curve B) in FIG. 4, there is derived the minimum required reloading force on the pressure relief piston 2.

The difference in amount between curves A and B indicates the excess force which is present for mass acceleration or for reasons of safety.

In the reloading phase, only the minimum force necessary in each case is established, of course, on the pressure relief piston 2 since a corresponding force of traction on the chain 5 opposes the excess force of the spring assembly 11.

FIG. 2 is a diagram of the lever mechanism, indicating the dimensions that have been selected in the example of the embodiment shown, namely:

$$a = 33 \text{ mm}, d = 46 \text{ mm}, e = 46 \text{ mm};$$

and the measurements resulting therefrom are:

$$f = 22.8 \text{ mm}; g = 20 \text{ mm}.$$

FIG. 3 shows the kinematics of the lever mechanism for a full stroke of the pressure relief piston, three intermediate positions being shown in each case.

It is seen that in the reloading phase—corresponding to curve B in FIG. 4—an initially large piston stroke produces a small change in pressure, and a large increase in pressure finally follows from a small change in stroke. It follows from this that a non-linear variation of the force is established on the pressure relief piston.

By the intermediate positions between the initial and end positions of the compression spring assembly and pressure relief piston shown in FIG. 3, it is seen that an initial step-down ratio is changed into a step-up ratio.

In the foregoing, the terms "upward" and "downward" and the like refer to directions as seen in the Figures. No limitation as to permissible orientations of the pressure modulator is intended.

Although an illustrative embodiment of the invention has been described herein, the invention is not limited by such embodiment. Rather, the invention includes many modifications and variations of the preceding that may occur to one skilled in the art.

What is claimed is:

1. A pressure modulator for an anti-locking brake system, comprising:
    inlet means for receiving hydraulic fluid pressure from an operator-actuated hydraulic pressure generator;
    outlet means for transmitting hydraulic fluid pressure to a brake;
    control means for communicating hydraulic pressure between the inlet means and the outlet means, the control means including an expandable chamber having a valve for controlling fluid flow between the chamber and the inlet means, the chamber being partially defined by a movable section thereof, and the outlet means communicating with the chamber independently of the valve;
    first biasing means urging the valve in a second direction;
    second biasing means urging said movable section in a first direction to reduce the volume of said chamber, said movable section engaging the valve, and said second biasing means thereby biasing the valve in said first direction opposite to said second direction;
    actuating means for selectively exerting an actuating force substantially in said second direction for opposing said second biasing means and thereby moving said movable section in said second direction to increase the volume of said chamber; and
    transmission means including lever means for transmitting forces between said actuating means, said movable section and said second biasing means, said lever means providing a transmission ration which varies as a function of the movement of said movable section.

2. A pressure modulator as in claim 1, wherein the lever means includes first and second tappets respectively engaging the movable section and the second biasing means, and a lever having first and second ends which are pivotally connected to said first and second tappets, said lever being pivotally mounted in the pressure modulator at a point intermediate the first and second ends.

3. A pressure modulator as in claim 2, wherein said tappets are pivotally mounted to said movable section, said second biasing means, and said lever by ball joints.

4. A pressure modulator as in claim 2, wherein the lever is configured and dimensioned for transmitting forces between said movable section and said second biasing means with a step-down transmission ratio when the movable section is displaced relatively little in the second direction, but a step-up transmission ratio when said movable section is displaced relatively farther in the second direction.

5. A pressure modulator as in claim 2, wherein the actuating means comprises drive means for driving said first end of said lever in said second direction.

6. A pressure modulator for an anti-locking brake system, comprising:
    inlet means for receiving hydraulic fluid pressure from an operator-actuated hydraulic pressure generator;
    outlet means for transmitting hydraulic fluid pressure to a brake;
    control means for communicating hydraulic pressure between the inlet means and the outlet means, the control means including an expandable chamber having a valve for controlling fluid flow between the chamber and the inlet means, the chamber being partially defined by a movable section thereof, and the outlet means communicating with the chamber independently of the valve;
    first biasing means urging the valve in a closing direction;
    second biasing means urging said movable section in a first direction to reduce the volume of said chamber, said movable section engaging the valve, and said second biasing means thereby biasing the valve in an opening direction opposite to said closing direction;
    actuating means for selectively exerting an actuating force for opposing said second biasing means and thereby moving said movable section in a second direction to increase the volume of said chamber; and
    transmission means including lever means for transmitting forces between said actuating means, said movable section and said second biasing means, said lever means providing a transmission ration which varies as a function of the movement of said movable section; wherein the lever means includes first and second tappets respectively engaging the movable section and the second biasing means, and a lever having first and second ends which are pivotally connected to said first and second tappets, said lever being pivotally mounted in the pressure modulator at a point intermediate the first and second ends; and wherein the drive means comprises a chain for pulling the first end of the lever in the second direction, a pulley for pulling the chain, a motor, and a clutch for selectively transmitting a variable force from the motor to the pulley.

7. A pressure modulator as in claim 1, wherein the lever means interconnects said movable section, said second biasing means and said actuating means, said variable transmission ratio being defined as between said movable section and said second biasing means.

8. A pressure modulator as in claim 1, wherein said second biasing means comprises a compression spring.

9. A pressure modulator as in claim 1, wherein the first and second biasing means exert respective selected biasing forces on said valve, such that said valve will close when the hydraulic pressure received by said inlet means corresponds to a locking pressure of said brake system.

* * * * *